(12) United States Patent
Park et al.

(10) Patent No.: US 6,839,060 B1
(45) Date of Patent: Jan. 4, 2005

(54) METHOD AND DEVICE OF CONSISTENCY BUFFER FOR HIGH PERFORMANCE 3D GRAPHIC ACCELERATOR

(75) Inventors: Woo Chan Park, Seoul (KR); Tack Don Han, Seoul (KR)

(73) Assignee: Yonsei University, Seoul (KR)

( * ) Notice: Subject to any disclaimer, the term of this patent is extended or adjusted under 35 U.S.C. 154(b) by 277 days.

(21) Appl. No.: 09/650,781

(22) Filed: Aug. 30, 2000

(30) Foreign Application Priority Data

Aug. 26, 2000 (KR) ...................................... P2000-49844

(51) Int. Cl.$^7$ .............................................. G06F 15/80
(52) U.S. Cl. ...................................... 345/505; 345/422
(58) Field of Search .................................. 345/565, 505, 345/422, 419, 619, 537, 549; 708/490; 710/1, 22; 709/203; 711/162, 125

(56) References Cited

U.S. PATENT DOCUMENTS

| | | | |
|---|---|---|---|
| 5,870,109 A | * | 2/1999 | McCormack et al. ....... 345/565 |
| 6,457,034 B1 | * | 9/2002 | Morein ....................... 708/490 |
| 6,473,086 B1 | * | 10/2002 | Morein et al. .............. 345/505 |

OTHER PUBLICATIONS

Whole et al.; *A Superscalar 3D Graphics Engine IEEE*; 1999.

* cited by examiner

*Primary Examiner*—Matthew C. Bella
*Assistant Examiner*—Dalip K. Singh
(74) *Attorney, Agent, or Firm*—Sheridan Ross PC

(57) ABSTRACT

A method and a device of consistency buffer for a high performance 3D graphic accelerator is disclosed to retain consistency without detecting any overlapping region in advance but determining an overlapping with respect to a rendered pixel. The device of consistency buffer according to the present invention comprises a fetch section for transmitting a plurality of primitives to be processed to a vacant region of the buffer, an issue section for buffering the plurality of the primitives transmitted from the said fetch section, and allotting positions to be inputted, a plurality of rendering accelerators for receiving and rendering the plurality of primitives allotted by the issue section, a consistency buffer for storing information required for processing with consistency according to a depth value and a color value of each primitive computed by each of the rendering accelerators, and a memory interface unit for performing read/write computation in a memory by mens of processing with consistency in order based on the information stored in the consistency buffer.

10 Claims, 7 Drawing Sheets

FIG.2
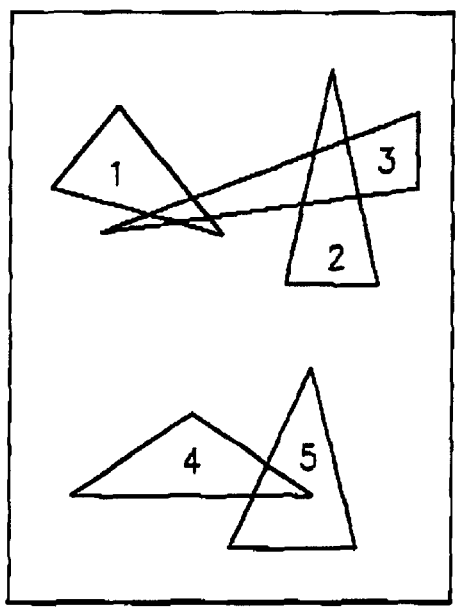
FIG.3a              FIG.3b
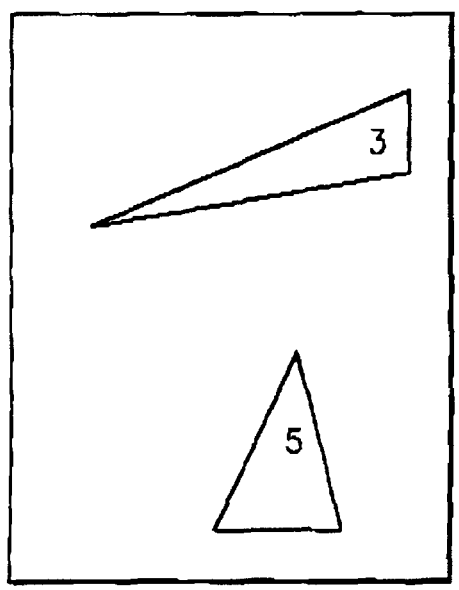   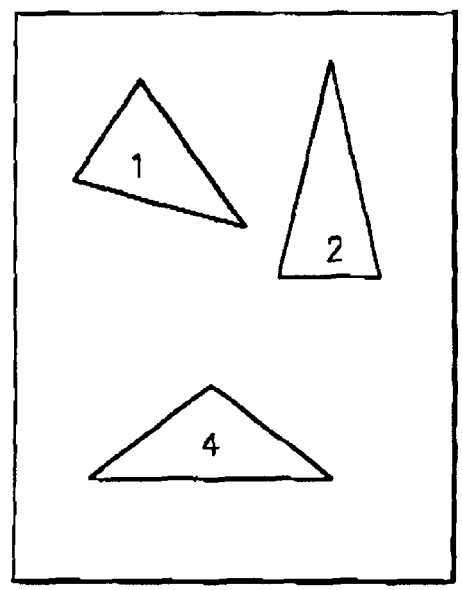

FIG.8

| | v | z | x | y | color |
|---|---|---|---|---|---|
| 0 | | | | | |
| 1 | | | | | |
| ⋮ | | ⋮ | ⋮ | ⋮ | ⋮ |
| n−2 | | | | | |
| n−1 | | | | | |

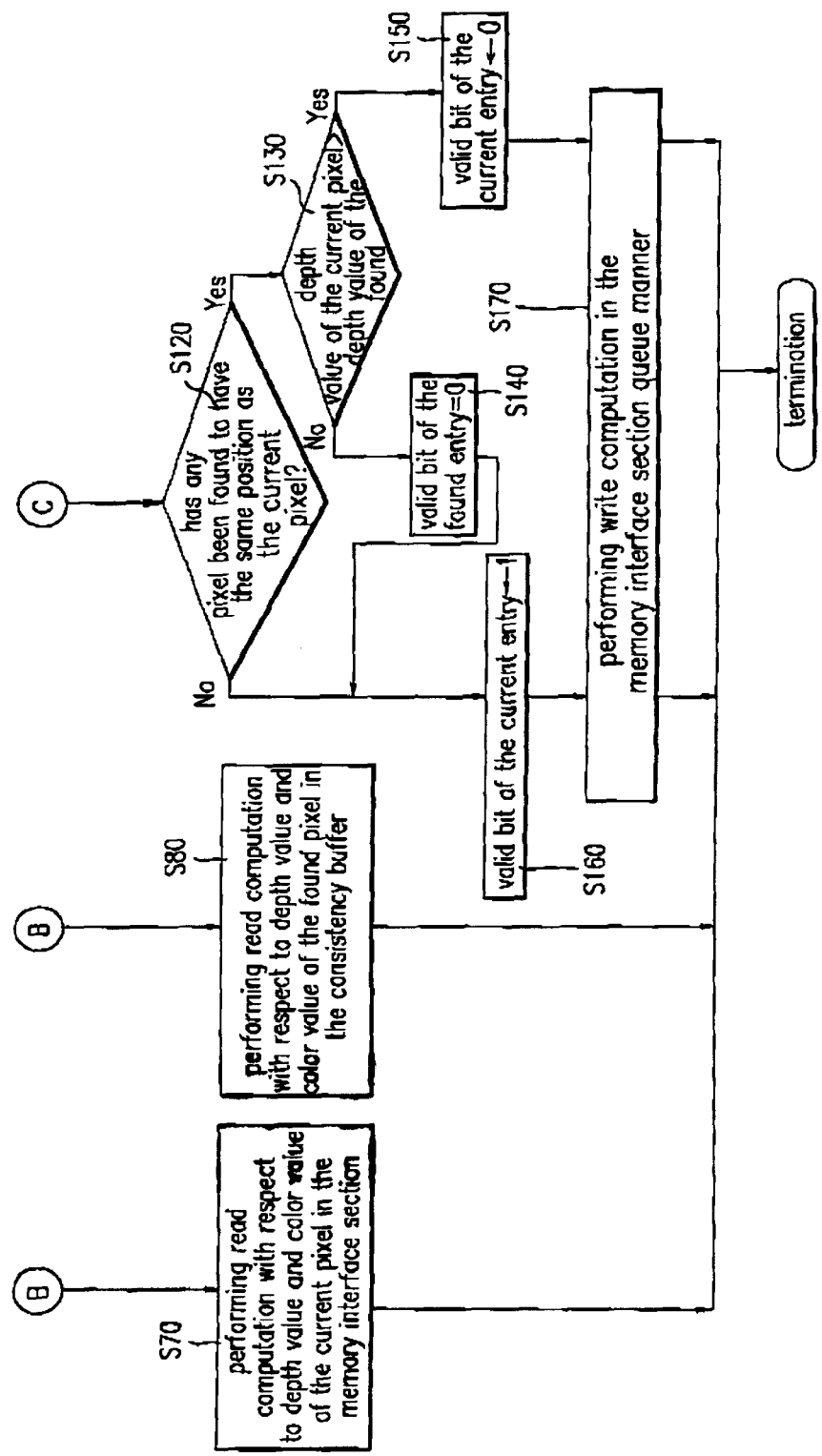

US 6,839,060 B1

METHOD AND DEVICE OF CONSISTENCY BUFFER FOR HIGH PERFORMANCE 3D GRAPHIC ACCELERATOR

BACKGROUND OF THE INVENTION

1. Field of the Invention

The present invention relates to a three-dimensional (3D) graphic accelerator, and more particular to a buffer structure to retain consistency in a 3D graphic accelerator processing primitives in parallel inside of a rendering processor.

2. Description of the Related Art 3D graphics is a most critical part for constructing an environment for multimedia, and necessitates a 3d graphic accelerator.

The 3D graphic accelerator needs to undergo a quite complicated computing procedure in order to display 3D graphics, i.e., converting a software-wise calculation to a hardware-wise calculation.

Rendering chips in general of a 3D graphic accelerator mounted on PCs have a structure of processing in high speed with respect to a single primitive. Therefor, it consumes a considerable time to process a great number of primitives.

For this reason, a rendering chip structure of high speed, which can simultaneously process a plurality of primitives by using a parallelism of the primitives, has been recently suggested.

FIG. 1 is a block diagram illustrating the 3D graphic processing steps according to the conventional technology.

Referring to FIG. 1, if a 3D applicable software 1 is transferred to a 3D graphic accelerator 3 through an application program interface (PI) 2, the 3D graphic accelerator is transferred to a display 4 after performing a real-time hardware acceleration.

At this stage, a rendering processor 3b in most of the 3D graphic accelerator 3 mainly use primitives of triangular shape for a high-speed processing because the triangular shape is easy to be processed in hardware-wise.

The primitives are 3D data inputted to the 3D graphic accelerator 3, mainly composed of dots, lines and polygons.

However, processing a plurality of primitives by using the parallelism thereof in the course of 3d graphic processing poses a problem of inconsistency when the primitives overlap on a screen.

The following is a description of the parallelism and inconsistency of the primitives made with reference to an embodiment of the rendering chip structure according to the conventional technology.

When each primitive does not have any overlapping region on a coordinate of a screen, parallel processing can be performed irrespective of the inputted order of the primitives to a rendering processor. This is referred to as an out-of-order execution.

FIG. 2 is a diagram illustrating five primitives displayed on a single frame according to an embodiment of the conventional technology.

The five triangular primitives are inputted to the rendering processor in the order from triangle No. 1 to the triangle No. 5. Referring to FIG. 2, a first region comprises triangle Nos. 1 to 3, and a second region comprises triangle Nos. 4 and 5. Here, the first region does not overlap the second region. In the region 1, the triangle No. 1 does not overlap the triangle No. 2, while the triangle No. 3 overlaps the triangle Nos. 1 and 2. In the region 2, the triangle No. 4 overlaps the triangle No. 5.

FIGS. 3(a) and 3(b) are diagrams dividing the triangles in FIG. 2 into two so as not to be overlapped one another.

If the rendering processor processes the plurality of primitives in parallel, the triangle Nos. 3 and 5 in FIG. 3(a) or the triangle Nos. 1, 2 and 4 in FIG. 3(b) do not overlap one another. Thus, those triangles can be processed in parallel irrespective of the inputted order.

However, processing of FIGS. 3(a) and 3(b) needs to be performed in sequential order because of overlapping. If the processing is performed in parallel, the final value may not be correct with respect to the overlapping regions. The following is an explanation of that occasion made with reference to an embodiment.

In FIG. 2, assume that the depth of the triangle No. 4 by reference to a depth of a pixel A in the overlapping region is 50, and that the depth of the triangle No. 5 by reference to the depth of the pixel A in the overlapping region is 20.

Herein, the pixel A has a maximum depth value that can be represented by a number of bits among the values stored in the memory as a background value. Hereinafter, the depth value of A will be referred to as "MAX."

If the triangle Nos. 4 and 5 are rendered and displayed on a screen, the overlapping region between the triangle Nos. 4 and 5 must be displayed to have a final value of 20 as a depth value of the triangle No. 5 by reference to the depth of the pixel A.

To be specific, if the triangle No. 4 is rendered with respect to the pixel A, the depth value 50 of the triangle No. 4 is compared with MAX value, which is a background value so as to store the less value 50 in the memory. Also, if the triangle No. 5 is rendered, the depth value 20 of the triangle No. 5 is compared with the depth value 50, the less value 20 is stored to be 20 in the memory. Therefore, the depth value of the triangle 5 is ultimately stored to be 20 in the memory.

However, a problem is posed when the triangle Nos. 4 and 5 are processed in parallel.

If the depths of the triangle No. 4 the triangle No. 5 are simultaneously compared with respect to the pixel A, the depth value 50 of the triangle No. 4 is compared with the background value MAX. Then, the depth value to be stored in the memory is determined to be 50. At the same time, the depth value 20 of the triangle No. 5 is compared with the background value MAX. Then, the depth value to be stored in the memory is determined to be 20. Here, a conflict is generated between the depth values 20 and 50 so as to be stored in the memory.

If the depth value 20 is first determined, and the depth value 50 is determined later, the depth value to be stored in the memory is defined to be 50. In that case, incorrect outcome is generated. This problem is called a "consistency problem."

To resolve the consistency problem generated when the primitives overlap on a screen due to the parallel structure, a separate unit is required for checking and management of the overlapping regions. A superscalar method used by S3 Company has been suggested for this.

FIG. 4 is a block diagram illustrating an overall structure of 3D rendering processor using a superscalar method recently published by S3 Company according to the conventional technology, which can simultaneously operate n number of rendering accelerators in parallel.

Referring to FIG. 4, the rendering processor comprises a fetch unit 10 for receiving and transmitting the primitives to be processed to a vacant region of the buffer, an issue unit 20 for allotting and managing so as to retain consistency in processing the plurality of primitives transmitted from the fetch unit 10 in parallel, a rendering accelerator 30 for rendering by means of a texture cache after receiving the plurality of primitives allotted and managed by the issue unit 20, and a memory interface unit 40 for processing the memory command by using the command defined by the rendering accelerator 30.

The following is a description of an operation of the rendering processor constituted above.

The fetch unit 10 brings the primitives to be processed to the rendering accelerator 30. If a first buffer of the issue unit 20 has a vacant region, the primitives are transferred to the first buffer of the issue unit 20.

The information on the primitives allotted to the accelerator 30 for rendering is transferred from the first buffer to the second buffer and is stored in the second buffer.

The issue unit 20 checks if there exists any overlapping region by using the information on the primitives, which have not yet been inputted to the rendering accelerator 30 but are buffered by a first buffer among the primitives transmitted from the fetch unit 10, as well as the information on the primitives of the second buffer, which are rendered by the rendering accelerator 30.

As a result of the checking, it is determined whether or not to process in parallel according to the overlapping region. Depending on the determination, the corresponding primitives are rendered by the respective rendering accelerator 30.

Once the rendering of the primitives allotted to each rendering accelerator 30 is completed, information on the primitives buffered in the issue section 20 is re-adjusted.

FIG. 6 is a block diagram illustrating a structure of a register used as a buffer in an issue unit of FIG. 4. Referring to FIG. 6, a candidate buffer is equivalent to the first buffer, while a destination reservation station and a source reservation station are equivalent to the second buffer.

The structures of the register shown in FIG. 6 have information on the triangles either waiting at the issue unit so as to be rendered by the rendering accelerator or being rendered by the rendering accelerator.

Accordingly, the issue unit 20 computes whether or not there exists any overlapping region based on the above information, and controls the rendering performed in parallel according to the computed result. In this regard, it is quite difficult to compute the overlapping region with respect to the primitives buffered by the second buffer without being inputted to the rendering accelerator 30 as well as to the primitives buffered by the first buffer.

In other words, most of the primitives are based on triangles for simplification of the rendering, and it is difficult to compute accurately in hardware-wise whether or not there exists any overlapping region by means of the coordinate value of the triangles.

Accordingly, the calculation of the overlapping region between the plurality of primitives is generally made by forming a rectangular bounding box outside of the triangle, as shown in FIG. 5.

The reason for computing the overlapping region by forming a rectangle outside of the triangle is that, whereas maximum and minimum values of a primitive can be computed in a line unit based only on the coordinate value of two vertexes diagonally lined in case of a rectangle, maximum and minimum values of a primitive need to be computed for the positions fo the lines connecting each vertex as well in addition to the three vertexes in case of a triangle. Thus, much more amount of maximum and minimum values of a primitive needs to be computed in a line unit in case of a triangle than in case of a rectangle. Subsequently, much more amount of calculation as to an existence of any overlapping region is required.

The 3D rendering processor using the superscalar method performs a checking the overlapping by forming a rectangular bounding box outside of a triangular primitive to be rendered.

However, the rendering processor of a 3D graphic accelerator according to the conventional technology poses the following problems.

First, since the rendering processor using the superscalar method computes an overlapping region by using a bounding box, the calculation is made as if an overlapping region exists in a primitive even though no overlapping region exists in fact. This is due to the bounding box generating an overlapping region. As a consequence, the performance of rendering is deteriorated.

Second, if any overlapping region exists in one triangular primitive, the rendering must be performed in a sequential order to region other than the overlapping region. Therefore, the performance of rendering is also deteriorated.

Third, the overall design becomes complex due to the plurality of buffers and complicated control inside of the issue unit.

SUMMARY OF THE INVENTION

To solve the above problems, an object of the present invention is to provide a method and a device of consistency buffer for a high performance 3D graphic accelerator, which determines an existence of any overlapping region with respect to a rendered pixel and assists in consistency rather than checking the overlapping region in advance.

To achieve the above object, the device of consistency buffer for a high performance 3D graphic accelerator according to the present invention comprises: a fetch section for transferring the primitives; and issue section for buffering a plurality of primitives transmitted from the fetch section and allotting the positions to be inputted; rendering accelerators for receiving and rendering the plurality of primitives allotted by the issue section; a consistency buffer for storing information on each primitive by each rendering accelerator, and performing a consistency processing based on the stored information, wherein the consistency buffer comprises a plurality of entries having valid bits, depth values, color values, and coordinate values; and a memory interface unit for performing read/write computation into a memory according to an order by using information stored in the consistency buffer.

The consistency buffer, operated in a queue manner, further comprises a head pointer indicating a head portion of the entry, for which a write computation is to be performed, and a tail pointer indicating an entry, in which the most update information computed by the accelerator is to be stored.

The method of consistency buffering for a high performance 3D graphic accelerator according to the present invention comprises a first step of: receiving a plurality of primitives; a second step of allotting the received primitives to one of at least two accelerators; a third step of rendering the primitives allotted to the accelerator; a fourth step of determining whether to perform a read computation or a write computation for the rendered primitives; a fifth step of storing depth values and color values of the rendered primitives in the consistency buffer, if there is determined to perform the write computation; and a sixth step of defining a depth value and a color value of one entry per pixel by using the depth values and the color values of the primitives stored in the consistency buffer, and performing a write computation into the memory while retaining consistency based on the defined values.

The fifth and sixth steps above comprise the sub-steps of: detecting all the pixels of the same screen position as the current pixel having an valid bit defined to be 1 among all the entries in the consistency buffer; defining the valid bit of the current entry to be 1, when the detection finds no same pixel and performing the write computation in queue manner comparing the current depth value of the pixel in the current entry with the depth value of the pixel in a detected kth entry when the detection finds any same pixel; defining the valid bit of the pixel in the $k^{th}$ entry to be 0 and the valid bit of the current entry to be 1 when the depth value of the pixel in the $k^{th}$ entry is greater than the depth value of the pixel in the current entry, and performing the write computation in queue manner; and defining the valid bit of the pixel in the current entry to be 0 when the depth value of the pixel in the $k^{th}$ entry is less than the depth value of the pixel in the current entry, and performing the write computation in queue manner.

The fifth and sixth steps above further comprise the sub-steps of: storing the depth value and the color value of the current pixel in the current entry indicated by the tail pointer and defining the valid bit of the entry according to the current pixel to be 1.

The depth value and the color value of the pertinent pixel are stored in the consistency buffer indicated by the tail pointer, and the write computation is performed based on the information on the pixel stored in the consistency buffer indicated by the head pointer.

BRIEF DESCRIPTION OF THE DRAWINGS

The other objects, features and advantages of the present invention will become more apparent with the following detailed description made with reference to the embodiments accompanying the drawings, in which:

FIG. 2 is a diagram illustrating five primitives displayed on a single frame according to an embodiment of the conventional technology;

FIGS. 3a and 3b are diagrams dividing the triangles in FIG. 2 into two so as no to be overlapped one another;

FIG. 8 is a block diagram illustrating a structure of the consistency buffer according to the present invention; and FIGS. 9a and 9b are a flow chart illustrating a rendering process of a high performance 3D graphic accelerator.

DETAILED DESCRIPTION OF THE INVENTION

The following is a detailed description of the method and device of consistency buffer for a high performance 3D graphic accelerator according to a preferred embodiment of the present invention.

Figure 7:
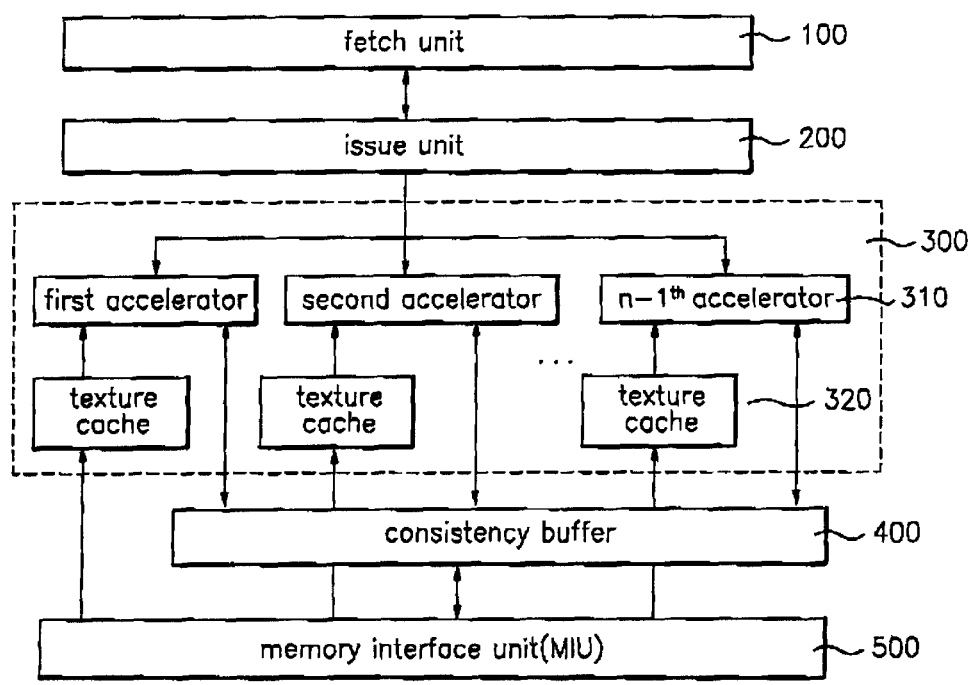
FIG. 7 is a block diagram illustrating a structure of a rendering processor adopting a consistency buffer according to the present invention.

FIG. 7 is a block diagram illustrating a structure of a rendering processor adopting a consistency buffer according to the present invention. Referring to FIG. 7, the device of consistency buffer comprises a fetch section 100 for transmitting a plurality of primitives to be processed to a vacant region of the buffer; an issue section 200 for buffering the plurality of primitives transmitted from the fetch section 100, and allotting the positions to be inputted; a rendering accelerator 300 for receiving and rendering the plurality of primitives allotted by the issue section 200; a consistency buffer 400 for storing information required for processing with consistency according to the depth value and color value of each primitive computed by the respective rendering accelerator 300; and a memory interface unit (MIU) 500 for performing read/write computation into the memory for processing with consistency in an order by using the information stored in the consistency buffer 400.

Figure 1:
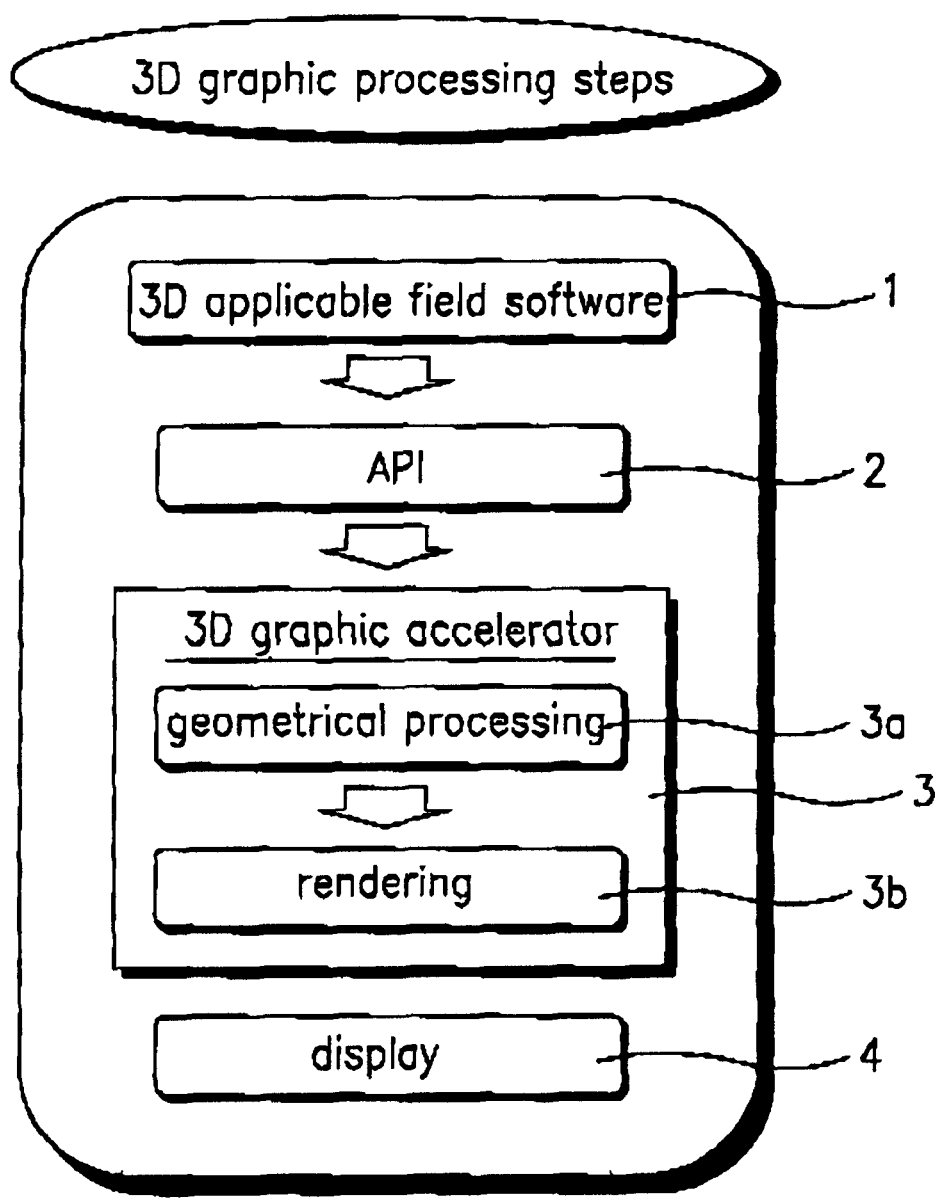
FIG. 1 is a block diagram illustrating a 3D graphic processing steps according to the conventional technology.
Figure 4:
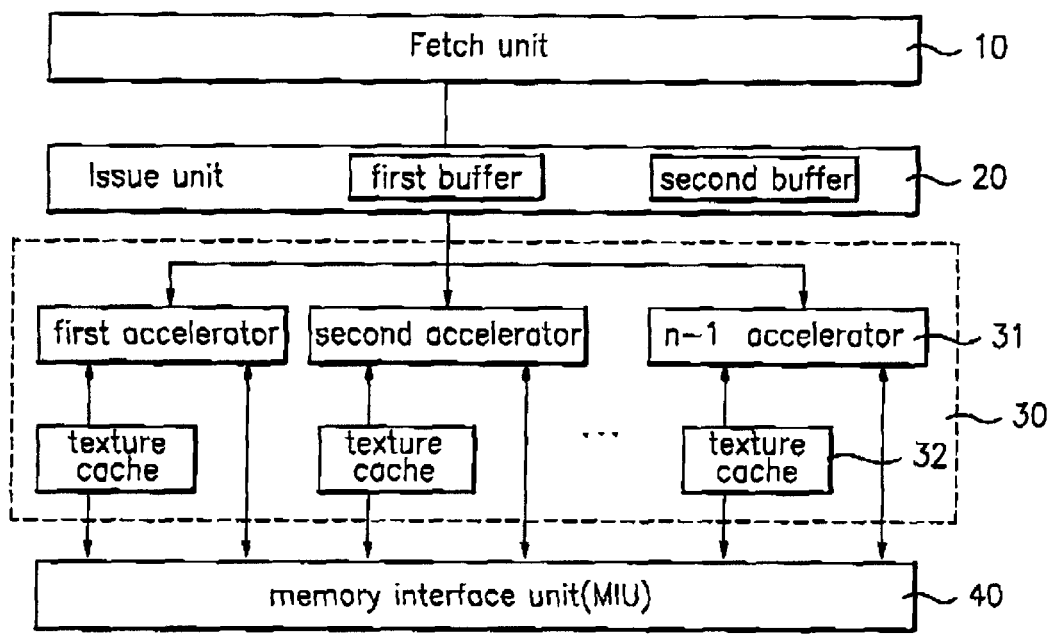
FIG. 4 is a block diagram illustrating an overall structure of a 3D rendering processor using a superscalar method recently published by S3 Company according to the conventional technology.
Figure 5:
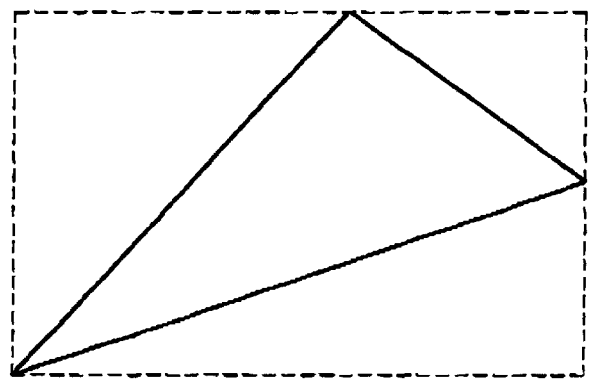
FIG. 5 is a diagram illustrating a bound box with respect to a single triangle according to the conventional technology.
Figure 6:
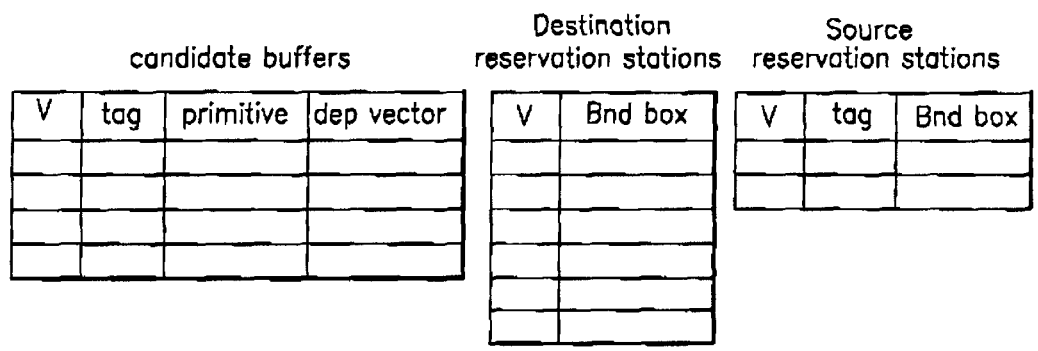
FIG. 6 is a block diagram illustrating a structure of a register used as a buffer in an issue unit of FIG. 4.

FIG. 7 reflects a difference in the issue section 200 and the consistency buffer 400 from FIG. 4 showing the conventional technology.

The issue section 200 plays a role of linking the fetch section 100 to a plurality of accelerators 310 so that the plurality of accelerators 310 can control the processing in parallel and in order depending on the circumstances.

The issue section 400 according to the present invention does not use the complicated buffer section as shown in FIG. 4 but plays a role of checking the accelerators that do not operate currently among the plurality of accelerators 310, and buffering and allotting the primitives fetched by the fetch section 100. The processing with consistency is performed by the consistency buffer 400.

Figure 8:
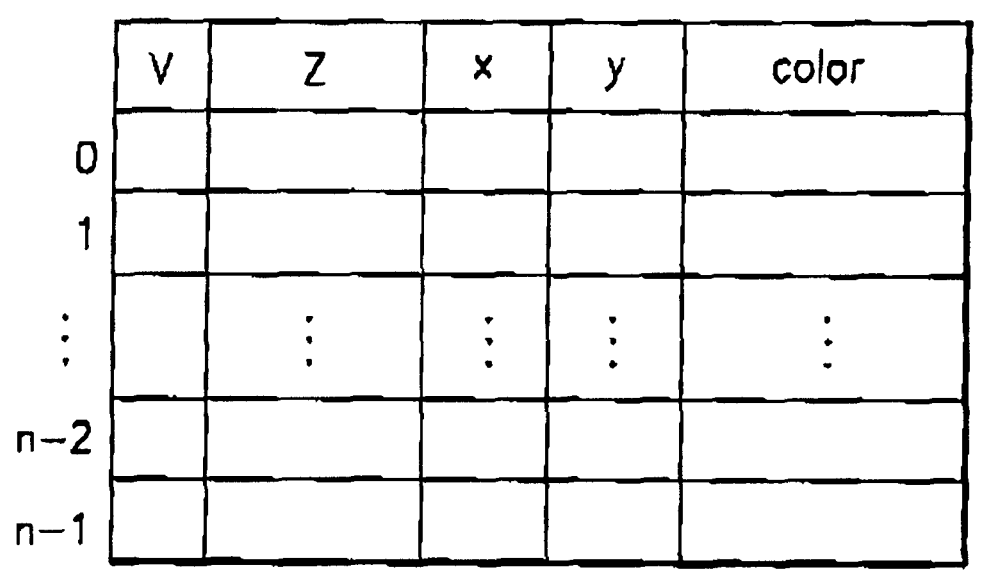

FIG. 8 is a block diagram illustrating a structure of the consistency buffer according tot he present invention. The consistency buffer shown in FIG. 8 stores the pertinent information when each accelerator performs a write computation into the memory having a screen coordinate (x,y) for the computed depth value z and the color value. The stored information is used for checking the consistency.

The consistency buffer 400 is operated in queue manner, and the entry comprises a valid bit, depth values z, x, y and a color value.

The queue manner is operated by using head pointer and the tail pointer.

The head pointer is sent to the memory interface unit (MIU) 500 to indicate the head portion of the entry where the write computation is currently performed. The pointer is then moved at the time when the write computation is completed.

The tail pointer is adjacent to the most-recently used entry to indicate a vacant entry as well as a place to store the information most-recently computed by each accelerator.

The number of entries is proportional to the number of accelerators and delay time of the memory.

The MIU 500 has a pointer of the entry of the consistency buffer 400, which is not currently performing the write computation, and performs a write computation with respect to an entry having a valid bit of 1. Here, the valid bit being 1 means that pertinent entry is valid.

The following is a detailed description of the method for retaining consistency by using the consistency buffer 400 made with reference to the drawings.

Figure 9A:
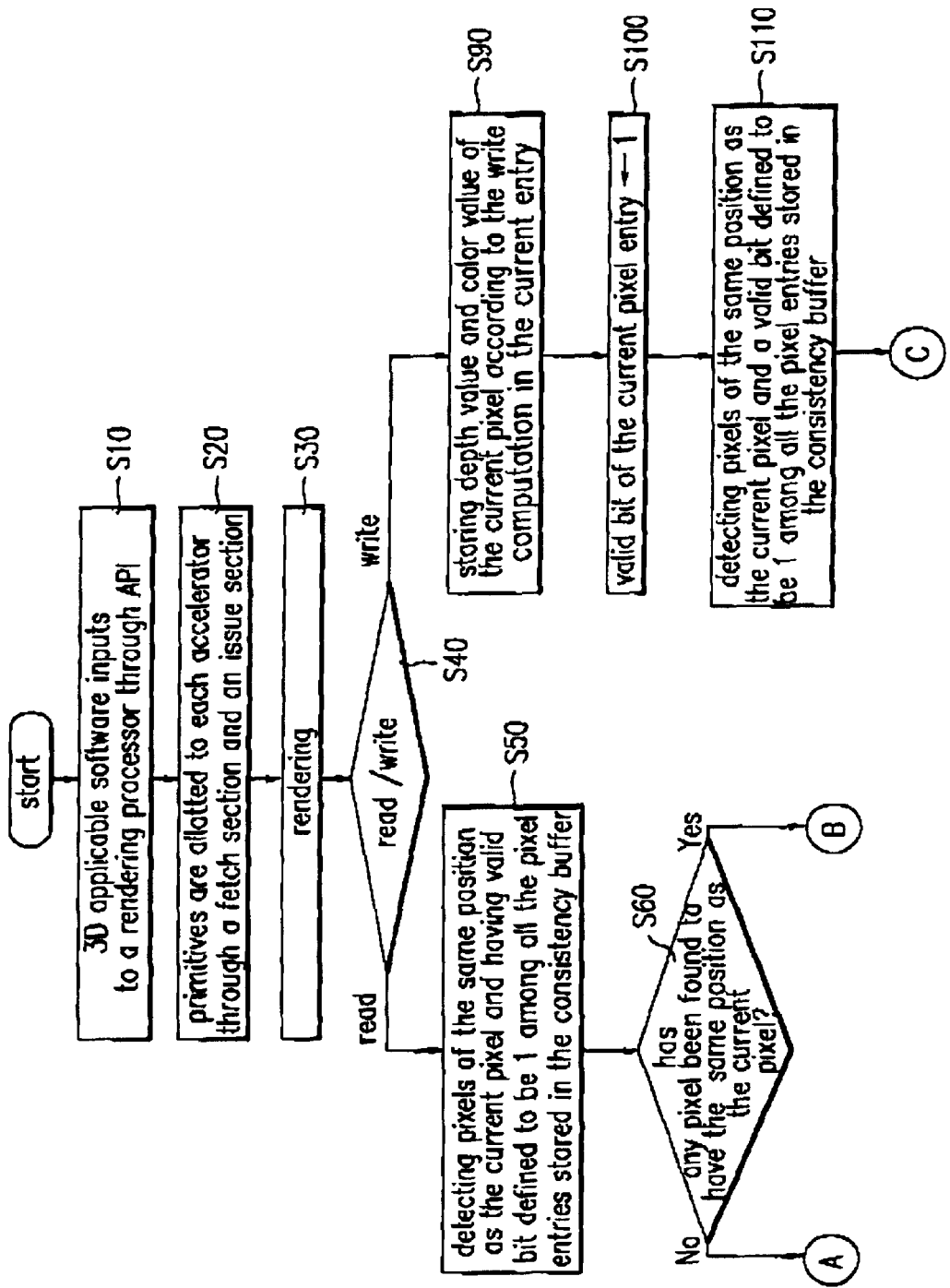

FIGS. 9a and 9b are a flow chart illustrating a rendering process of a high performance 3D graphic accelerator. Referring to FIGS. 9A and 9B, 3D software is inputted to the rendering processor through API. Then, the primitives are allotted to each accelerator 310 through the fetch section 100 and issue section 200 (S20). Each accelerator 310 performs a rendering of the allotted primitives. The computation into the memory is classified into a read computation and a write computation.

The read computation is performed as follows. Of all the pixel entries stored in the consistency buffer, the pixels having the same screen position (x, y) as the current pixel and the valid bit defined to be 1 are detected (S50). When the detection finds any pixels having the same screen position as the current pixel, the depth value and the color value of the detected pixel is currently within the consistency buffer 400.

Therefore, the read computation is immediately performed with the consistency buffer 400 (S80).

When the detection finds no pixel having the same screen position (x, y) as the current pixel, the depth value and the color value of the detected pixel is currently within the memory (not shown in the drawings). Therefore, the read computation is performed with the memory interface section 500.

The write computation is performed as follows. The depth value and the color value of the current pixel for the write computation into the memory are stored in the current entry indicated by the tail pointer. The valid bit of the entry according to the current pixel is defined to be 1(S100). At this stage, the tail pointer is moved from the current position to the adjacent vacant entry.

Of all the entry pixels in the consistency buffer, the pixels having the same screen position (x,y) as the current pixel and the valid bit defined to be 1 are detected (S110). If the detection finds no same pixel as the pixel of the current entry at all the positions (x, y) (S120), the valid bit of the current entry is defined to be 1(S160). Then, the write computation is performed in the MIU 500 in queue manner.

If the comparison finds any same pixel as the pixel of the current entry at all the positions (x, y) (S120), and assuming that the found pixel is in the $k^{th}$ entry, the current depth value is compared with the depth value of the $k^{th}$ entry (S130).

If the comparison finds that the depth value of the $k^{th}$ entry is less than the current depth value (S130), the pixel of the current entry is hidden by the pixel of the $k^{th}$ entry. Thus, no information is required on the current position (x, y), depth or color. Accordingly, the valid bit of the current entry is defined to be 0 (S150).

Based on the corrected information on the entries, write computation is performed into the memory in order from the head pointer portion of the consistency buffer 400 through the MIU 500 (S170) with respect to an entry having a valid bit of 1.

By contrast, if the comparison finds that the depth value of the $k^{th}$ entry is greater than the current depth value (S130), no information is required on the $k^{th}$ entry.

Accordingly, the valid bit of the $k^{th}$ entry is defined to be 0(S140), while the valid bit of the current entry is defined to be 1 (S160).

Based on the corrected information on the entries, write computation is performed into the memory in order from the head pointer portion of the consistency buffer 400 through the MIU 500 (S170).

As described above, the method and the device of consistency buffer for a high performance 3D graphic accelerator according to the present invention provide the following effects.

First, the processing can be performed in parallel even if overlapping regions exists among the triangles. Thus, a high performance is guaranteed.

Second, performance degradation that might be caused by computation of an overlapping region due to using a bounding bx can be avoided. Therefore, time is considerably saved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A high performance 3D graphic accelerator adapting a consistency buffer, comprising:

a fetch section for transmitting a plurality of primitives;

an issue section for buffering said plurality of primitives transmitted from said fetch section, and allotting positions to be inputted;

a plurality of rendering accelerators for receiving and rendering said plurality of primitives allotted by said issue section;

a consistency buffer for storing information on each primitive rendered by each of said rendering accelerators, and performing a consistency processing for overlapping primitives based on the stored information, wherein the consistency buffer comprises a plurality of entries having valid bits, depth values, color values, and coordinate values; and a memory interface unit for performing read/write computation into a memory according to an order by using the information in said consistency buffer.

2. The consistency buffer claim 1, being operated in queue manner, and further comprising a head pointer indicating a head portion of an entry, in which write computation is to be performed, and a tail pointer indicating an entry to store information most recently computed by said accelerator.

3. A method of consistency buffering for a high performance 3D graphic accelerator adapting a consistency buffer, comprising:

(a) receiving a plurality of primitives;

(b) allotting the received primitives to one of at least two accelerators;

(c) rendering the allotted primitives;

(d) determining whether to perform a read computation or a write computation for the rendered primitives;

(e) storing depth values and color values of the rendered primitives in the consistency buffer, if there is determined to perform the write computation; and, (f) defining a depth value and a color value of one entry per pixel by using the depth values and color values of the primitives stored in the consistency buffer, and performing write computation in-to a memory while retaining consistency for overlapping primitives based on the defined values.

4. The method of consistency buffering of claim 3, wherein said step (e) further comprises:

storing the depth value and the color value of the current pixel in a current entry indicated by a tail pointer; and, defining a valid bit of an entry according to the current entry to be 1.

5. The method of consistency buffering of claim 3, wherein said step (f) further comprises:

detecting all the pixels of the same screen position as the current pixel having a valid bit defined to be 1 among all the entries in said consistency buffer;

defining the valid bit of said current entry to be 1, when the detection finds no same pixel and performing the write computation in queue manner;

comparing the current depth value of the pixel in the current entry with the depth value of the pixel in a detected $k^{th}$ entry when the detection finds any same pixel;

defining the valid bit of the pixel in the $k^{th}$ entry to be 0 and the valid bit of the current entry to be 1 when the depth value of the pixel in the $k^{th}$ entry is greater than the depth value of the pixel in the current entry, and performing the write computation in queue manner; and defining the valid bit of the pixel in the current entry to be 0 when the depth value of the pixel in the $k^{th}$ entry is less than the depth value of the pixel in the current entry, and performing the write computation in queue manner.

6. The method of consistency buffering of claim 5, wherein said depth value and color value of a pertinent pixel are stored in the consistency buffer indicated by the tail pointer, while the write computation is performed based on the information of the pixel stored in the consistency buffer indicated by the head pointer.

7. A method of consistency buffering for a high performance 3D graphic accelerator adapting a consistency buffer, comprising;

(a) receiving a plurality of primitives;

(b) allocating the received primitives to one of at least two accelerators;

(c) rendering the allotted primitives;

(d) determining whether to perform a read computation or a write computation for the rendered primitives;

(e) detecting all the pixels of the same screen position as the current pixel having a valid bit defined to be one among all entries in the consistency buffer, when a read computation is determined to be performed in said determining step;

(f) performing a read computation with respect to the depth value and the color value of the current pixel when the detection finds no pixel in a $k^{th}$ entry having the same position as the current pixel; and (g) performing a read computation with respect to the depth value and the color value of the pixel in the $k^{th}$ entry when the detection finds a pixel in the $k^{th}$ entry having the same position as the current pixel.

8. The method of consistency buffering of claim 7, wherein the read computation is performed based on the information of the pixel stored in the consistency buffer indicated by the head pointer.

9. The method of consistency buffering of claim 7, wherein, in the step (f), the read computation with respect to the depth value and the color value of the current pixel is performed in the memory interface unit.

10. The method of consistency buffering of claim 7, wherein, in the step (g), the read computation forth respect to the depth value and color value of the found pixel is performed in the consistency buffer.

* * * * *